US011199763B2

United States Patent
Chien et al.

(10) Patent No.: US 11,199,763 B2
(45) Date of Patent: Dec. 14, 2021

(54) PROJECTOR

(71) Applicant: QISDA CORPORATION, Taoyuan (TW)

(72) Inventors: Chih-Shiung Chien, Taoyuan (TW); Ming-Kuen Lin, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/984,106

(22) Filed: Aug. 3, 2020

(65) Prior Publication Data

US 2021/0055641 A1 Feb. 25, 2021

(30) Foreign Application Priority Data

Aug. 22, 2019 (CN) .......................... 201910780870.8

(51) Int. Cl.
  *G03B 21/20* (2006.01)
  *G02B 26/00* (2006.01)

(52) U.S. Cl.
  CPC ......... *G03B 21/204* (2013.01); *G02B 26/008* (2013.01); *G03B 21/2013* (2013.01); *G03B 21/2066* (2013.01); *G03B 21/2073* (2013.01)

(58) Field of Classification Search
  CPC .............. G03B 21/204; G03B 21/2013; G03B 21/2066; G03B 21/2073; G02B 26/008
  USPC .......................................................... 353/31
  See application file for complete search history.

(56) References Cited

U.S. PATENT DOCUMENTS

| 2014/0198301 A1* | 7/2014 | Yagyu | H04N 9/3158 |
| | | | 353/31 |
| 2020/0285138 A1* | 9/2020 | Kurata | G02B 27/102 |
| 2020/0301266 A1* | 9/2020 | Nakamura | H04N 9/3152 |

FOREIGN PATENT DOCUMENTS

| CN | 102419507 A | 4/2012 |
| CN | 106647126 A | 5/2017 |
| CN | 108663881 A | 10/2018 |
| CN | 108761981 A | 11/2018 |

* cited by examiner

*Primary Examiner* — Jerry L Brooks

(57) ABSTRACT

A projector includes a light source, a collimator lens, a wavelength conversion module and a dichroic filter. The light source provides a first beam. The collimator lens has a first portion and a second portion. The wavelength conversion module includes a reflecting plate and a wavelength conversion layer. The wavelength conversion layer is an annular structure disposed on the reflecting plate. The dichroic filter corresponds to the first portion of the collimator lens. The dichroic filter reflects the first beam to project onto the reflecting plate and the wavelength conversion layer. A second beam reflected by the reflecting plate passes through the second portion of the collimator lens. A third beam excited by the wavelength conversion layer passes through the first portion and the second portion of the collimator lens and the dichroic filter.

13 Claims, 5 Drawing Sheets

PROJECTOR

BACKGROUND OF THE INVENTION

1. Field of the Invention

The present invention relates to a projector, and more particularly, to a projector with advantages of fewer components, preferred efficiency and small dimensions.

2. Description of the Prior Art

The conventional laser projector utilizes the blue light laser source to provide the illumination beam, as disclosed in U.S. Pat. No. 9,618,737. The illumination beam is transformed into an excitation beam with different color via a wavelength conversion device (such as the color wheel partly covered by phosphor powder or quantum dot material); then, the excitation beam can be mixed with the illumination beam for related application. The conventional alignment module utilizes the dichroic component to reflect the illumination beam toward the color wheel. A portion of the color wheel made by wavelength conversion material generates the excitation beam accordingly, and the excitation beam can pass through the dichroic component. Besides, a part of the illumination beam passes through another portion of the color wheel without wavelength conversion function and moves back the dichroic component via reflecting components, and then is reflected by the dichroic component to mix with the excitation beam. The conventional alignment module has drawbacks of expensive hardware cost and heavy weight due to a large number of optical components.

SUMMARY OF THE INVENTION

The present invention provides a projector with advantages of fewer components, preferred efficiency and small dimensions for solving above drawbacks.

According to the claimed invention, a projector includes a light source, a collimator lens, a wavelength conversion module and a dichroic filter. The light source is adapted to provide a first beam. The collimator lens has a first portion and a second portion divided by an axle. The wavelength conversion module includes a reflecting plate and a wavelength conversion layer, and the wavelength conversion layer is an annular structure disposed on the reflecting plate. The dichroic filter is disposed on a position corresponding to the first portion of the collimator lens. The dichroic filter is adapted to reflect the first beam, so as to project the first beam onto the reflecting plate and the wavelength conversion layer. A second beam reflected by the reflecting plate passes through the second portion of the collimator lens, and a third beam excited by the wavelength conversion layer passes through the first portion and the second portion of the collimator lens and the dichroic filter.

According to the claimed invention, the dichroic filter has a function of being passed by a first polarized state beam and reflecting a second polarized state beam. The projector further includes a first polarization component and a second polarization component. The first polarization component is disposed between the light source and the dichroic filter, and adapted to transform the first beam from the first polarized state beam into the second polarized state beam. The second polarization component is disposed between the dichroic filter and the collimator lens, and adapted to generate the second beam with the first polarized state. The dichroic filter reflects the first beam with the second polarized state, so as to project the first beam onto the reflecting plate and the wavelength conversion layer.

The projector of the present invention utilizes the wavelength conversion module capable of partly reflecting an illumination beam and partly generating an excitation beam to match with the dichroic filter corresponding to the first portion of the collimator lens, or to combine with the polarization component for matching the dichroic filter close to or aligning with the central axle of the collimator lens, to structure the alignment module with a least amount of elements inside constrained space for mixing. The dichroic filter may have several applications; for example, the dichroic filter can reflect some specific-color beam and allow passing of other color beam, or can allow passing of one specific-polarized beam and reflect another polarized beam. Arrangement of the light source, the dichroic filter and the polarization component of the projector may be changed in accordance with the dichroic component having specific features.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
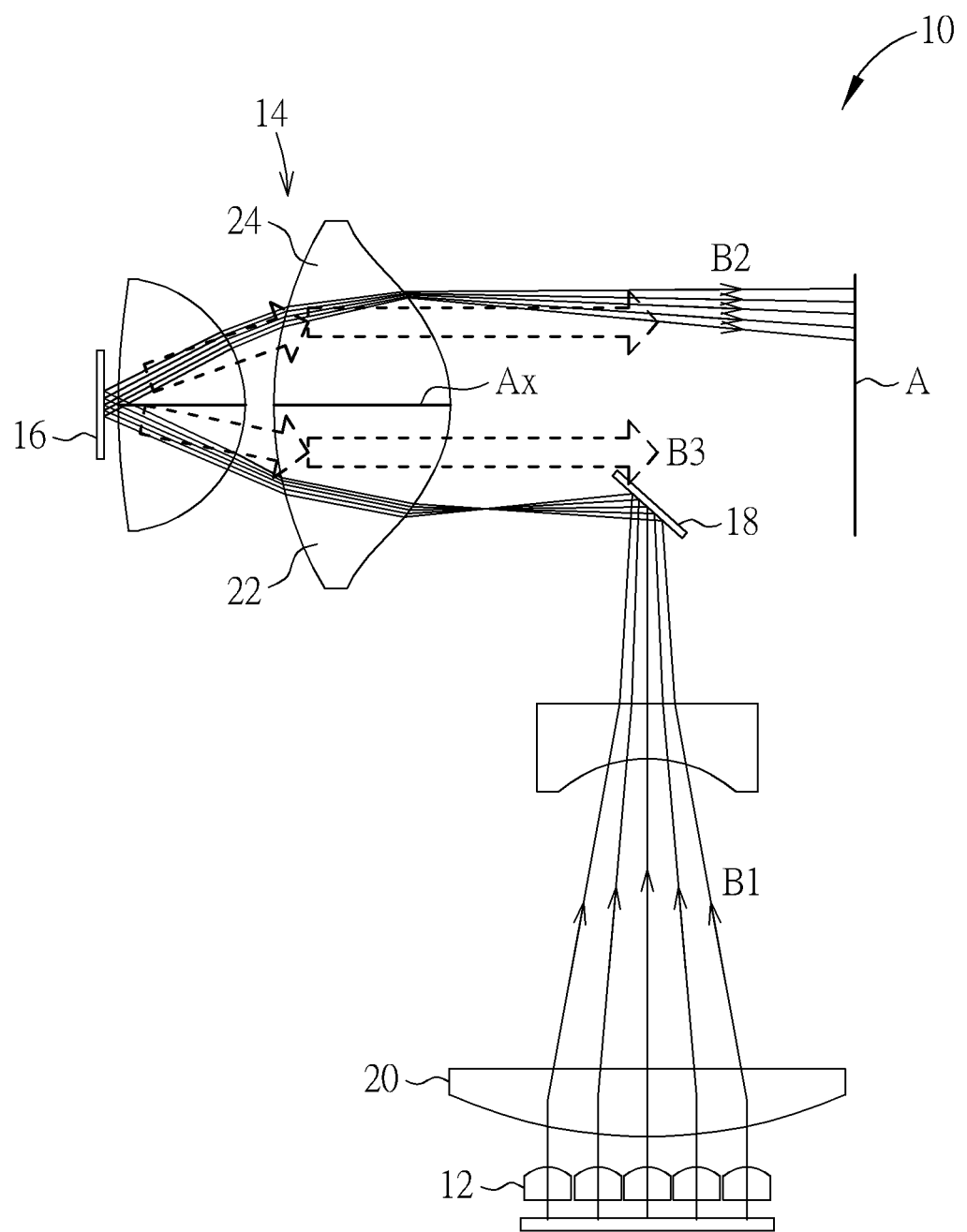
FIG. 1 is a diagram of a projector according to an embodiment of the present invention.
Figure 2:
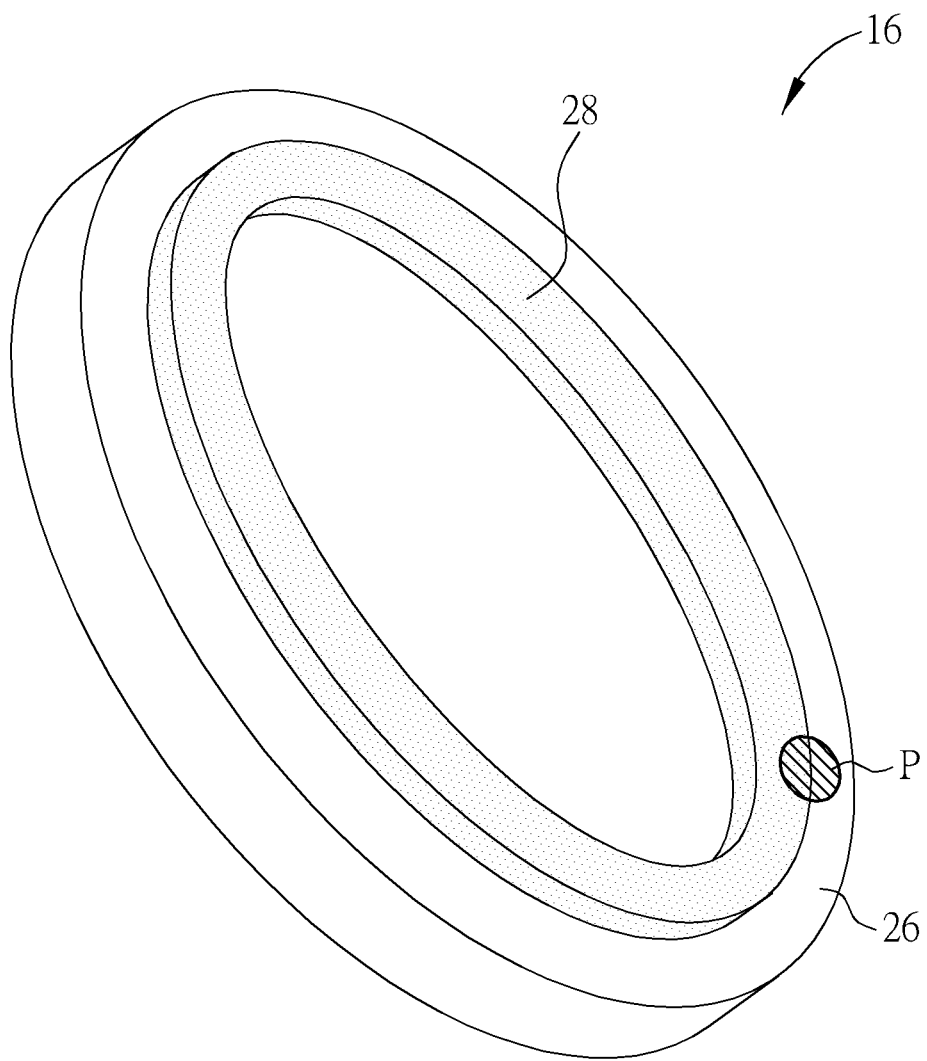
FIG. 2 is a diagram of a wavelength conversion module according to the embodiment of the present invention.

Please refer to FIG. 1 and FIG. 2. FIG. 1 is a diagram of a projector 10 according to an embodiment of the present invention. FIG. 2 is a diagram of a wavelength conversion module 16 according to the embodiment of the present invention. The projector 10 can include a light source 12, a collimator lens 14, the wavelength conversion module 16, a dichroic filter 18 and a light condensing module 20. The collimator lens 14 can be located between the light source 12 and the wavelength conversion module 16, and have a first portion 22 and a second portion 24 divided by an axle Ax. Generally, the axle Ax can be, but not limited to, a central axle of the collimator lens 14, which depends on an actual demand. The wavelength conversion module 16 can have a reflecting plate 26 and a wavelength conversion layer 28. The wavelength conversion layer 28 can be an annular structure disposed on the reflecting plate 26. The dichroic filter 18 can be disposed on a position corresponding to the first portion 22 of the collimator lens 14, and adapted to reflect a first beam B1 provided by the light source 12 to project the first beam B1 onto the first portion 22 of the collimator lens 14. The light condensing module 20 can be an optional element disposed between the light source 12 and the dichroic filter 18, and adapted to condense a projection dimension of the first beam B1.

In the embodiment, the first beam B1 of the light source 12 can be projected onto the dichroic filter 18 via the light condensing module 20, and then be reflected and turned by the dichroic filter 18. The turned first beam B1 can pass through the first portion 22 of the collimator lens 14 and be projected onto the wavelength conversion module 16; in the meantime, the first beam B1 can be simultaneously projected onto the reflecting plate 26 and the wavelength conversion layer 28 of the wavelength conversion module 16. The first beam B1 projected onto the reflecting plate 26 can be reflected to generate a second beam B2; the wavelength conversion layer 28 can be excited by the first beam B1 to generate a third beam B3. The second beam B2 can pass through the second portion 24 of the collimator lens 14 due to reflection and be transmitted toward a beam-receiving area A. The third beam B3 is a beam generated by the wavelength conversion layer 28, and can pass through the first portion 22 and the second portion 24 of the collimator lens 14 and the dichroic filter 18 for transmitting toward the beam-receiving area A.

The collimator lens 14 of the present invention can be a monolithic optical component or an assembly consisted of a plurality of optical components. Any collimator lens having the first portion 22 and the second portion 24 divided by the axle Ax can conform to a design scope of the present invention. In addition, the wavelength conversion module 16 has a rotatable property. The reflecting plate 26 can be rotated via a rotation axle (which is not shown in figures). The wavelength conversion layer 28 can be an annular structure based on a center of the reflecting plate 26. When the wavelength conversion module 16 is rotated, a spot P generated by the first beam B1 can be projected onto the reflecting plate 26 and the wavelength conversion layer 28, so that the reflected second beam B2 and the excited third beam B3 can be continuously and simultaneously transmitted toward the beam-receiving area A. The beam-receiving area A may include an integrator or LCD panels or other possible optical component, which depends on the design demand.

Figure 3:
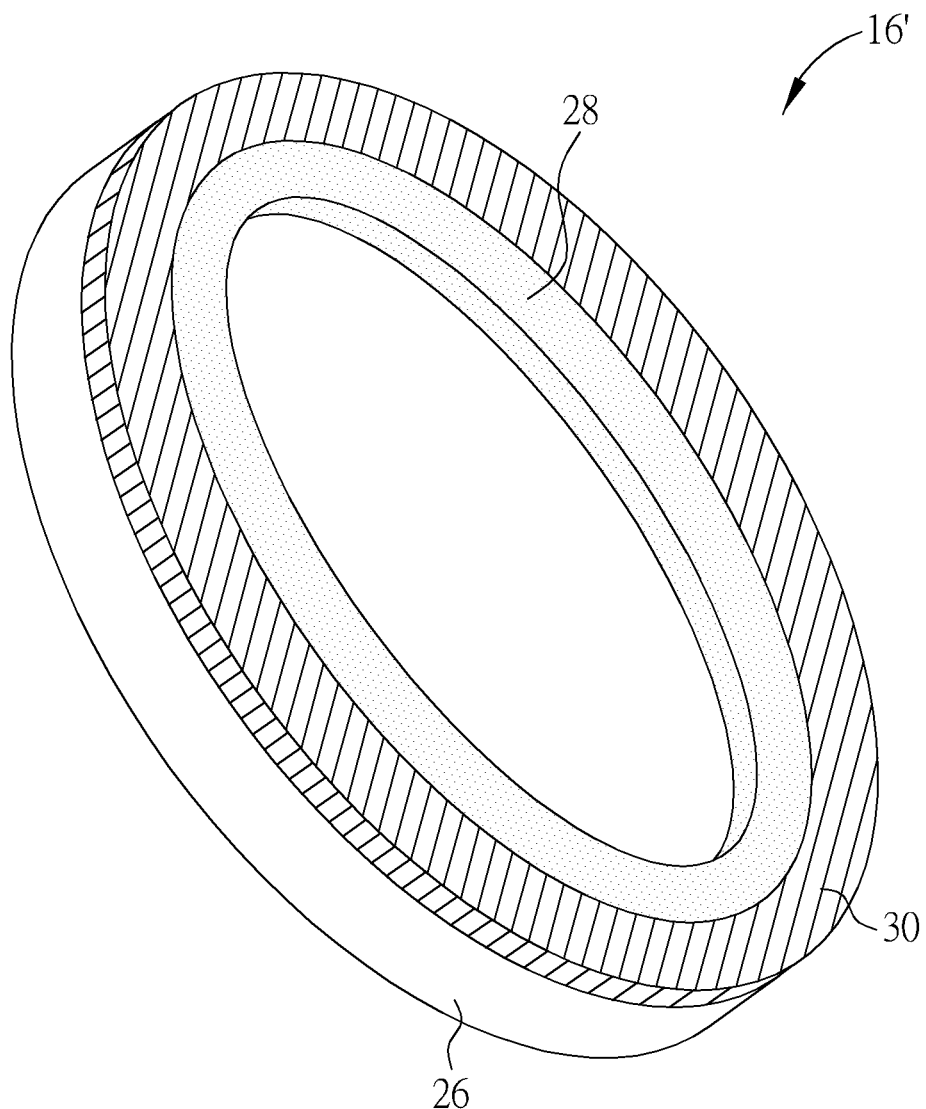
FIG. 3 and FIG. 4 are diagrams of the wavelength conversion modules according to other embodiments of the present invention.
Figure 4:
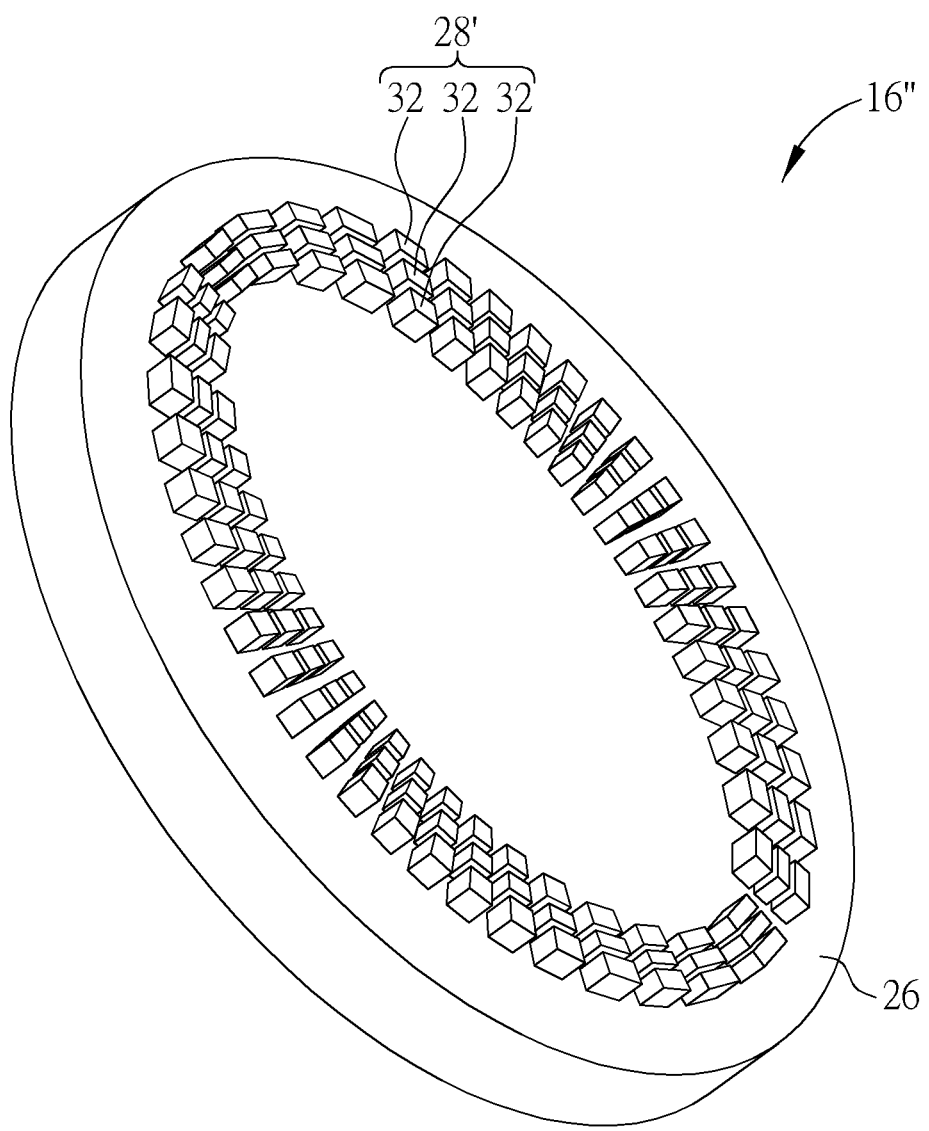

The wavelength conversion layer 28 of the present invention can be a solid layer, which means a contour of the annular structure is filled with wavelength conversion material. The first beam B1 projected onto the wavelength conversion layer 28 can be completely transformed into the third beam B3 via excitation; however, the wavelength conversion layer may have other possible embodiments. Please refer to FIG. 3 and FIG. 4. FIG. 3 and FIG. 4 are diagrams of the wavelength conversion modules 16' and 16" according to other embodiments of the present invention. The wavelength conversion module 16' can have the reflecting plate 26, the wavelength conversion layer 28 and a diffusing layer 30. The diffusing layer 30 can be disposed on the reflecting plate 26 as an annular form, and align with an outer side of the wavelength conversion layer 28, as the embodiment shown in FIG. 3. The diffusing layer 30 aligning with an inner side of the wavelength conversion layer 28 is optional and available. Thus, the first beam B1 can be simultaneously projected onto the wavelength conversion layer 28 and the diffusing layer 30; the first beam B1 is projected onto the wavelength conversion layer 28 to generate the third beam B3 via excitation, and further projected onto the diffusing layer 30 to generate the second beam B2 via reflection.

As the embodiment shown in FIG. 4, the wavelength conversion module 16" can have the reflecting plate 26 and the wavelength conversion layer 28', and the wavelength conversion layer 28' includes a plurality of laying blocks 32 arranged in a separated manner to form the annular structure. When the wavelength conversion module 16" receives the first beam B1, the first beam B1 can be projected onto the laying blocks 32 of the wavelength conversion layer 28' and some part of the reflecting plate 26 in a gap between the adjacent laying blocks 32, which means the reflected second beam B2 and the excited third beam B3 can be generated simultaneously. Dimensions, shapes, arrangement and density of the laying block 32 are not limited to the embodiment shown in the figure, and depend on the design demand. In the foresaid embodiments, the dichroic filter 18 can reflect blue light and allow passing of other color light, so that the first beam B1 and the second beam B2 can be the blue light and the third beam B3 can be yellow light in response to property of the wavelength conversion module. Color of the first beam, the second beam and the third beam can be varied according to reflection and transparent property of the dichroic filter 18.

Figure 5:
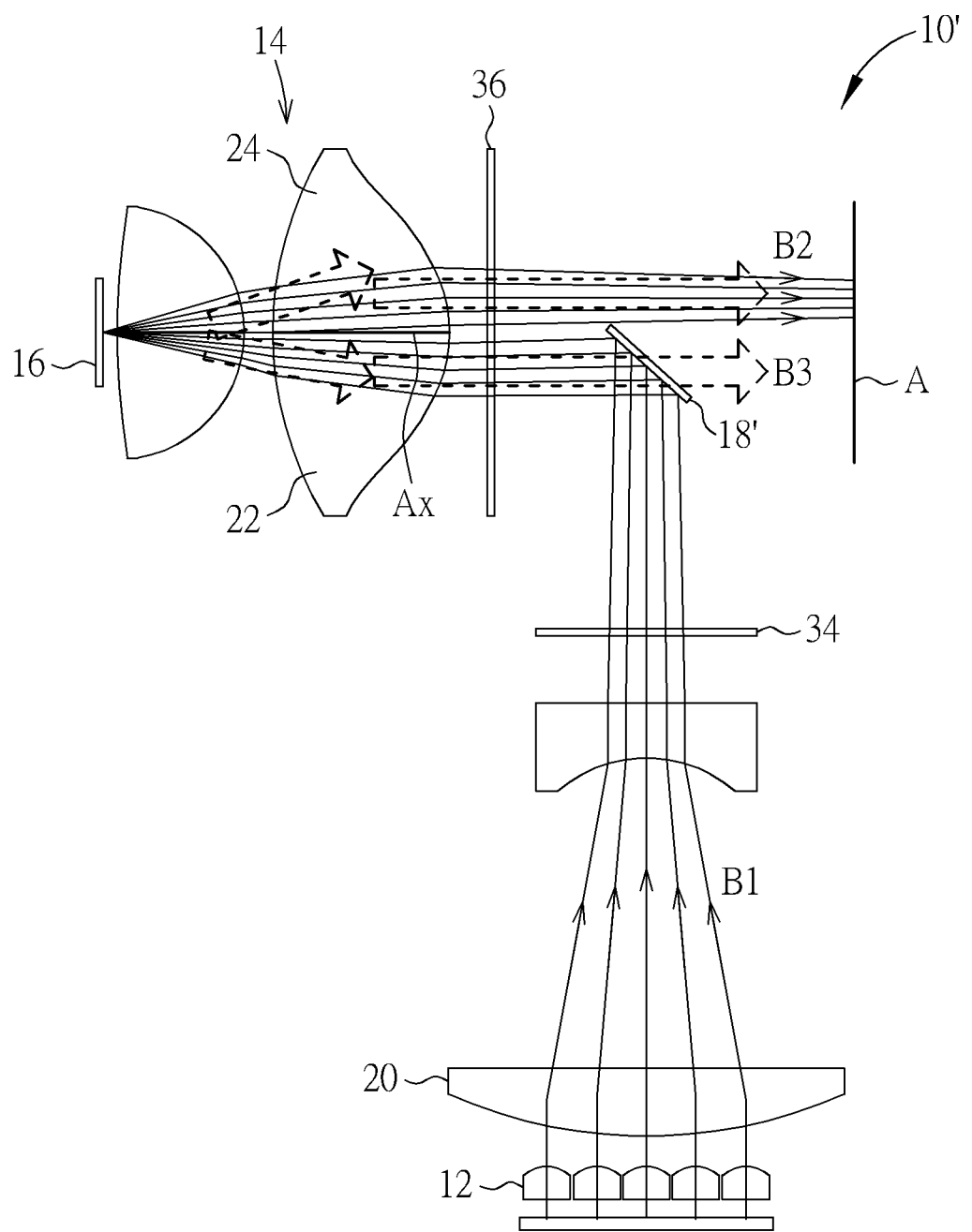
FIG. 5 is a diagram of the projector according to another embodiment of the present invention.

Please refer to FIG. 5. FIG. 5 is a diagram of the projector 10' according to another embodiment of the present invention. The projector 10' can include the light source 12, the collimator lens 14, the wavelength conversion module 16, the dichroic filter 18', the light condensing module 20, a first polarization component 34 and a second polarization component 36. In the embodiment, elements having the same numerals as ones of the foresaid embodiments have the same structures and functions, and a detailed description is omitted herein for simplicity. Difference between this embodiment and the foresaid embodiments is the dichroic filter 18' can be disposed on a position close to the axle Ax; for example, an edge of the dichroic filter 18' may align with the axle Ax, or the edge of the dichroic filter 18' may cross the axle Ax to locate on a position corresponding to the second portion 24. Besides, the dichroic filter 18' can have property of being passed by a first polarized state beam and reflecting a second polarized state beam. In the embodiment, the first polarized state beam can represent the P polarized beam and the second polarized state beam can represent the S polarized beam; however, the first polarized state beam may be the S polarized beam and the second polarized state beam may be the P polarized beam.

The first polarization component 34 can be disposed between the light source 12 and the dichroic filter 18', and adapted to transform the first polarized state beam into the second polarized state beam. The second polarization component 36 can be disposed between the dichroic filter 18 and the collimator lens 14, and adapted to generate the second beam B2 with the first polarized state. The dichroic filter 18' can reflect the second polarized state beam. Therefore, when the light source 12 provides the first beam B1 with the first polarized state, the first beam B1 can pass through the first polarization component 34 and be transformed into the second polarized state. The first beam B1 with the second polarized state can be projected onto the dichroic filter 18', and be turned toward the second polarization component 36 and the first portion 22 of the collimator lens 14 because of reflection, and then be projected onto the reflecting plate 26 and the wavelength conversion layer 28 of the wavelength conversion module 16. In this embodiment, the first polarization component 34 can be a half-wave plate, and the dichroic filter 18' can be passed by the P polarized beam and further reflect the S polarized beam, and the second polarization component 34 can be a quarter-wave plate.

The second beam B2 generated by reflection of the reflecting plate 26 and passing through the second portion 24 of the collimator lens 14 and the second polarization component 36 can have the first polarized state, and be transmitted toward the beam-receiving area A. The wavelength conversion layer 28 can be excited to generate the third beam B3, and the third beam B3 can pass through the first portion 22 and the second portion 24 of the collimator lens 14 and the dichroic filter 18', so as to transmit toward the beam-receiving area A and combine with the second beam B2. In this embodiment, the projector 10' can utilize the first polarization component 34 and the second polarization component 36 to project the first beam B1 (which is reflected by the dichroic filter 18') onto the wavelength conversion module 16 in a small angle of incidence, and further to project the second beam B2 and the third beam B3 onto the collimator lens 14 in other small angles of incidence; that is to say, the edge of the dichroic filter 18' can be close to or cross the axle Ax, so that an optical axle of the second beam B2 can approach an optical axle of t the third beam B3 for increasing image color uniformity of the projector 10'.

In conclusion, the projector of the present invention utilizes the wavelength conversion module capable of partly reflecting an illumination beam and partly generating an excitation beam to match with the dichroic filter corresponding to the first portion of the collimator lens, or to combine with the polarization component for matching the dichroic filter close to or aligning with the central axle of the collimator lens, to structure the alignment module with a least amount of elements inside constrained space for mixing. The dichroic filter may have several applications; for example, the dichroic filter can reflect some specific-color beam and allow passing of other color beam, or can allow passing of one specific-polarized beam and reflect another polarized beam. Arrangement of the light source, the dichroic filter and the polarization component of the projector may be changed in accordance with the dichroic component having specific features.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
    a light source adapted to provide a first beam;
    a collimator lens having a first portion and a second portion divided by an axle;
    a wavelength conversion module comprising a reflecting plate and a wavelength conversion layer, the wavelength conversion layer being a closed annular structure disposed on the reflecting plate; and
    a dichroic filter disposed on a position corresponding to the first portion of the collimator lens, the dichroic filter being adapted to reflect the first beam so as to simultaneously project the first beam onto the reflecting plate and the wavelength conversion layer through the first portion, a second beam reflected by the reflecting plate passing through the second portion of the collimator lens, and a third beam excited by the wavelength conversion layer passing through the first portion and the second portion of the collimator lens and the dichroic filter.

2. The projector of claim 1, further comprising:
    a light condensing module disposed between the light source and the dichroic filter, and adapted to condense a projection dimension of the first beam.

3. The projector of claim 1, wherein the axle is a central axle of the collimator lens.

4. The projector of claim 1, wherein the wavelength conversion layer is the annular structure based on a center of the reflecting plate.

5. The projector of claim 1, wherein the annular structure of the wavelength conversion layer is a solid layer.

6. The projector of claim 5, wherein the wavelength conversion module further comprises a diffusing layer disposed on the reflecting plate as an annular form, and the diffusing layer aligns with an inner side or an outer side of the wavelength conversion layer.

7. The projector of claim 1, wherein the wavelength conversion layer comprises a plurality of laying blocks arranged in a separated manner to form the annular structure.

8. The projector of claim 7, wherein the wavelength conversion layer further comprises a diffusing layer disposed between the plurality of laying blocks arranged in the separated manner.

9. The projector of claim 1, wherein the wavelength conversion module is rotatable.

10. The projector of claim 1, wherein the first beam and the second beam are blue light, the dichroic filter reflects the blue light and allows passing of other color light, and the third beam is yellow light.

11. The projector of claim 1, wherein the dichroic filter has a function of being passed by a first polarized state beam and reflecting a second polarized state beam, and the projector further comprises:
    a first polarization component disposed between the light source and the dichroic filter, and adapted to transform the first beam from the first polarized state beam into the second polarized state beam; and
    a second polarization component disposed between the dichroic filter and the collimator lens, and adapted to generate the second beam with the first polarized state.

12. The projector of claim 11, wherein the dichroic filter reflects the first beam with the second polarized state so as to project the first beam onto the reflecting plate and the wavelength conversion layer.

13. The projector of claim 11, wherein an edge of the dichroic filter aligns with the axle, or the edge crosses the axle to locate on a position corresponding to the second portion of the collimator lens.

* * * * *